United States Patent Office 3,265,508
Patented August 9, 1966

3,265,508
MANUFACTURE OF CONFECTIONERY
PRODUCTS BY EXTRUSION
Otto B. Wurzburg, Whitehouse Station, N.J., and Walter G. Kunze, Catonsville, Md., assignors to National Starch and Chemical Corporation, New York, N.Y., a corporation of Delaware
No Drawing. Filed Nov. 13, 1963, Ser. No. 323,224
2 Claims. (Cl. 99—134)

This application is a continuation-in-part of application Serial Number 142,479, filed October 3, 1961, now abandoned.

The present invention relates to the manufacture of candy and other confectionery products and in particular to an improved method for manufacturing such confectionery products.

Starch and modified starches are used in the manufacture of various types of confections. These starches impart texture and body to the confections and give them a desirable feel in the mouth. The starch also serves the function of adjusting the speed of dissolution of the confectionery product.

In the preparation of some types of confections it has been the practice to cook an aqueous mixture of sugars, starch, and starch products or natural gums or other additives, thereafter casting the mixture into molds. A considerable amount of water is initially required in most such processes in order to disperse or dissolve the ingredients of the mixture. After the dispersion is effected, excess water is ordinarily removed by holding the cook at high temperatures or in vacuum so as to permit evaporation of enough water to achieve the desired solids content. If at this point the water content is still higher than desired for the final product, the final gelling and formation of the solidified confection is obtained only after casting and storing the mix in molds, which are generally formed from dry starch. These molds must usually be maintained in drying rooms at elevated temperatures for extended periods.

It is seen that the formation of solid confections has therefore involved costly and time-consuming evaporation and/or storage in molds, in order to permit the desired gelling or solidification of the candy. Another disadvantage of the procedures heretofore utilized in making candy is that they do not lend themselves to continuous operation, since evaporation of excess moisture and/or the casting into molds and the subsequent drying of the confection mixture necessarily require a discontinuous processing technique.

It is an object of this invention to provide a novel method of producing candy and other confectionery products. It is another object of this invention to provide a method for making confectionery products which drastically reduces the time formerly required to prepare such products. Another object of this invention is to provide a continuous process for the production of confectionery products. Other objects and advantages of the invention will be apparent from the following description.

In accordance with the process of our invention, formed confectionery products are prepared from a mixture of sugars and a granular, ungelatinized, converted starch product having an amylose content no greater than about 35% by weight and a fluidity of at least 20. Other constituents such as coloring, flavors, medicinal agents, etc., may also be present. The above mixture is passed, in the presence of from about 2% to about 13% moisture, based on the weight of the total composition, through a heated extruder or other device which subjects the mixture to a combination of mixing, sufficient heat to dissolve the particular starch product employed, and sufficient pressure to force the resulting plastic mass from an orifice as a semi-solid or solid, formed, shape-retaining confection.

"Fluidity" is a term generally employed in the starch art to measure the degree to which a starch has been made more thin-boiling than the corresponding native, untreated starch. Starch, in its native, untreated, granular state, when heated in a given amount of water to a temperature beyond the gelatinization point of that particular starch (each starch type is known to have its own gelatinization temperature), results in a dispersion having a specific viscosity, usually quite heavy. When such a raw starch is treated chemically or physically, as by acid hydrolysis, dextrinization, oxidation, or certain esterification or etherification reactions, the resulting product, when heated in water, yields a less viscous (more fluid) product. The greater the "fluidity" value, as the figure is used throughout the starch industry, the greater has been the degree of conversion of the starch, and therefore the more fluid its aqueous dispersions. A fluidity value of 20 represents a starch which has been converted to an extent where its dispersions are substantially thinner than those of the raw, untreated starch, and it is to such starch products in their ungelatinized granule state, to which this invention is directed. This includes all commonly made dextrins, white or yellow, and British gums regardless of viscosity.

Such starch products may be derived from any source, such for example as corn, tapioca, waxy maize, potato, sorghum or wheat, so long as the starch is one which has an amylose content no higher than about 35% and the degree of conversion is such that the product is not more viscous than a 20 fluidity starch. Although a certain amount of unconverted or high-amylose starch may be present, the converted, conventional starch portion must comprise a major part of the starch component.

It is well known that conventional starches, whether they be derived from corn, tapioca, potato, wheat or other sources, normally consist of two fractions, namely amylopectin and amylose. For any particular starch type the ratio of amylopectin to amylose is a fairly constant value. None of the conventional starches contain more than about 35% by weight of the amylose portion (at least one starch, waxy maize, contains essentially no amylose). While certain hybrid starches have been developed which contain 50% or more of the amylose fraction, such so-called high-amylose starches have properties which are in some respects radically different from the conventional starches containing no more than about 35% amylose, and the use of high-amylose starches in the production of confections is the subject of a separate application Serial No. 323,244, filed November 13, 1963. This present application is limited to confections wherein converted conventional starches having an amylose content no greater than about 35% constitute the sole or major portion of the starch component in the formulation.

When such a converted conventional starch, in combination with sugars and from 2% to 13% water, based on the weight of the total composition, is subjected to the heat and mixing action of a heated extruder or equivalent device, the starch product is dissolved and dispersed in situ, and the product emerges as a plastic or semi-plastic solid which is shape-retaining and needs only to be cut to the desired size. There is no need for evaporation of excess fluid, nor for casting in molds and storing for days, as was the case with the materials formed by hitherto employed processes. The economic advantages are self-evident.

When we speak herein of the "dissolving" of a starch product, we refer to the act wherein the starch product, which was substantially in particulate, non-dispersed and non-dissolved form before subjection to the heat and mixing action of the extruder or equivalent device, is dispersed and dissolved within the extruder. While in the strictest technical sense a starch does not "dissolve" to form a true solution, the term is nevertheless generally used to describe the disruption, dispersal and dissolution of the starch particle.

The amount of moisture present in an extrusion mixture should be the minimal amount required to dissolve and disperse the starch product under the particular extrusion conditions, taking into account the particular starch product used, the nature and proportions of the other ingredients, the temperatures and pressures employed in the extrusion, and the nature of the candy desired. As stated, this amount of water is never greater than about 13%, based on the weight of the total composition. The use of such relatively low amounts of water, in combination with the use of granular starches of the conversion range set forth, and the subjection of such a mixture to the heat-pressure-mixing action of an extruder, with the converted starch granules dissolving within the extruder and absorbing even the small amount of water present, is what makes our improved product possible. As stated, our product emerges from the extruder in the form of a semi-solid or solid plastic mass, which needs no storage in starch molds. Although in most cases post-extrusive drying is unnecessary, it may sometimes be found desirable for some candies (especially those which are to undergo further treatment, such as pan coating) to dry for a short period. However, even in such cases the period of drying is not of the same magnitude as was necessitated by prior art processes.

The amount of the starch product in the mixture to be extruded will depend upon the type of confection that is to be made. In addition, the viscosity of the starch product itself, as well as the characteristics desired in the confection, will determine the amount of starch to be used. Accordingly, the quantity of the starch may vary in the process of this invention from about 10% to about 70%, as based on the weight of the entire formulation. The water content of the confectionery mixture, as was mentioned previously, may range from about 2% to about 13%, as based on the weight of the entire formulation. The remainder of the formulation is comprised of sugars, hereinafter defined, and minor amounts of desired additives, such as coloring or flavoring agents, plasticizers, medicinal agents, an the like.

When we speak of sugars in this specification, we mean all commonly used mono- and disaccharides and materials containing them, such as dextrose, starch syrup, levulose, sucrose, invert sugar, molasses, lactose, maltose, and the like, and those polyhydric alcohols such as sorbitol and mannitol, known for their sweet taste and which, as in the case of sorbitol, also have other desirable characteristics, such as low melting point, good compatibility with starch products, and a degree of plasticizing or dispersing ability.

There must be some water present in the extrusion mixture in order to permit the dispersal of the starch product. The precise amount of water which is present in the mixture will be determined, of course, by the nature of the starch product used and of the final product. Thus, for harder types of candy, only a limited quantity of moisture is required. In regard to the products requiring little moisture, the natural moisture inherent in the starch product of the sugars may impart sufficient moisture to the extrusion mixture. If such intrinsic sources of water prove insufficient or if larger quantities of moisture are required (as in the production of some softer type candies), then the requisite amount of water may be added as needed.

In preparing confectionery products by means of our process, the requisite amounts of starch product and sugars or mixture of sugars may first be mixed together. The water to be added, if any, is then sprayed onto the mixture of starch and sugar. Additives may be added to the mixture as desired. The resulting material ranges from a damp powder to a heavy mass which, if suitable, can be pelletized, that is, compacted into small aggregates by the use of any type of commercial pelletizing equipment. By pelletizing the extrusion mixture in this manner, subsequent feeding of the mixture into the extruder is facilitated. Alternatively, if the material is not suitable for pelletizing, it may be fed into the extruder by other well known mechanical means, such as by a ram. Obviously, the order of mixing the ingredients may be changed as desired.

For the extrusion step, one may employ any device capable of subjecting the mixture to sufficient heat to dissolve the starch, preferably with some shearing action, and sufficient pressure to force the mixture through an orifice. The orifice may have any desired size and shape, such for example as a square, round, or otherwise shaped opening. As a result of the combined heat, pressure and mixing action, the starch, sugar and other desired additives are effectively dispersed and mixed, in spite of the extremely low amounts of moisture present.

The first half of the extruder barrel may contain heating elements which dissolve the starch, whereas the second half of the extruder barrel may be water-cooled, serving to remove a considerable amount of heat from the cooked mixture. Another variation consists in having two or more extruders in tandem, one to heat and the other to cool. As the mixture is tumbled along the screw flights of the extruder or extruders, a uniform plastic mass will be formed.

The temperature used in the extruder barrel depends upon the amount and type of starch and sugars present in the mixture, as well as on the amount of water present. In order to realize the most favorable taste and color characteristics in the finished candy, the extrusion temperature should be as low as possible, provided, of course, that it is consistent with the desired properties of the candy. Some relatively soft candies that require a fair amount of water, may need extruder temperatures as low as about 180° F. (as measured by a thermocouple in the wall of the extruder barrel), whereas other formulations with less water require temperatures as high as 400° F. The actual extruder temperature is not critical to our invention, provided that the temperature employed is sufficient, as stated previously, to effect solution and mixing of the reagents. The particular temperature required will be a simple matter for the practitioner to determine.

The temperature of the extruder die should be kept in the range of from 100° F. to 250° F. depending on the type and amount of reagents used, as well as on the amount of water present in the extrusion mixture. It should be mentioned that the use of the extrusion method in this invention makes it possible to control various properties of the confection by varying the moisture content of the mixture and/or the temperature of extrusion.

The pressures utilized in our extrusion process will depend on the type of material to be extruded, the design of the screw, and the construction of the die. For the purposes of this invention, extrusion pressures ranging from 250 to 5000 p.s.i. have been found sufficient.

In the following examples, which further illustrate the embodiment of this invention, all parts given are by weight unless otherwise indicated. All of the starch products employed, whether dextrines or otherwise, had a fluidity of at least 20.

EXAMPLE I

This example illustrates the preparation of confectionery products using the extrusion process of this invention.

In preparing these confectionery products, the starch and the sugar were first mixed together. Additives, such as glycerine or citric acid, were dissolved in water, and then were sprayed onto the mixture of the starch and sugar, the entire mass then being agitated until fairly uniform in consistency. The resulting mass was then pelletized by running it through a commercial pelletizing apparatus wherein the outlet holes were 3/16" in diameter. The resulting pellets were then fed into a 3/4" screw extruder whose barrel temperature was maintained within a range of from 180° to 380° F. depending on product composition. In one case, this extruder had a circular die which was maintained at a temperature of between 190° and 210° F. and whose opening was 3/16" in diameter. This was not found to be critical, however. As the extruded confectionery product left this die, it formed a nearly perfect, glossy cylinder, which could be cut or otherwise processed.

Alternatively, the additives such as flavors, colors, etc., could be injected into the cooked and cooled material in the far end of the extruder.

The following Table 1 illustrates several typical formulations:

ing within the scope of this invention, which is limited only by the following claims.

We claim:

1. The method of making a confectionery product which comprises taking a mixture of sugar and a granular, ungelatinized, converted starch having an amylose content no greater than about 35% and having a fluidity of at least 20, the amount of starch being from about 10% to about 70% based on the weight of the total composition, said mixture containing from about 2% to about 13% of water based on the total weight of the composition, and said converted starch being in a non-dissolved form, and subjecting said mixture to simultaneous heat, pressure and mixing action of an extruder, said mixture being initially subjected in said extruder to heat which is at a temperature in the range of from about 180 to 400°

*Table 1*

| Formulation No. | Component | Moisture Content of Component, Percent | Amount of Component in Formulation (parts by wt.) | Total Moisture Content of Composition, Percent |
|---|---|---|---|---|
| 1 | Cane sugar | 1.0 | 100 | 9.1 |
|   | Tapioca dextrin [1] | 3.7 | 100 |   |
|   | Water | 100.0 | 15 |   |
| 2 | Dextrose | 9.5 | 118 | 7.5 |
|   | Corn dextrin [2] | 5.5 | 125 |   |
|   | Glycerine |   | 5 |   |
|   | Glucose syrup | 20.0 | 5 |   |
| 3 | Dextrose | 9.5 | 118 | 6.6 |
|   | Tapioca dextrin [3] | 3.7 | 125 |   |
|   | Glycerine |   | 5 |   |
|   | Glucose syrup | 20.0 | 5 |   |
| 4 | d-Sorbitol | 1.0 | 300 | 6.2 |
|   | Cane sugar | 1.0 | 300 |   |
|   | Acid hydrolyzed waxy maize starch [4] | 10.0 | 80 |   |
|   | Water | 100.0 | 30 |   |
|   | Citric acid |   | 3/16 |   |
| 5 | d-Sorbitol | 1.0 | 100 | 11.2 |
|   | Tapioca dextrin [5] | 3.7 | 100 |   |
|   | Water | 100.0 | 20 |   |
| 6 | d-Sorbitol | 1.0 | 50 | 13.0 |
|   | Tapioca dextrin [6] | 3.7 | 150 |   |
|   | Water | 100.0 | 23 |   |
| 7 | Dextrose | 9.5 | 50 | 9.9 |
|   | Tapioca dextrin [7] | 3.7 | 150 |   |
|   | Water | 100.0 | 15 |   |
|   | Glycerine |   | 40 |   |
| 8 | Dextrose | 9.5 | 100 | 11.1 |
|   | Tapioca dextrin [8] | 3.7 | 100 |   |
|   | Glucose syrup | 20.0 | 100 |   |
| 9 | Dextrose | 9.5 | 50 | 5.1 |
|   | Tapioca dextrin [9] | 3.7 | 150 |   |
| 10 | Water | 100.0 | 20 | 11.2 |
|   | Cane sugar | 1.0 | 100 |   |
|   | Tapioca dextrin [10] | 3.7 | 100 |   |

| | | | a | b | c | d | e | |
|---|---|---|---|---|---|---|---|---|
| 11 (a)–(e) | Acid hydrolyzed waxy maize starch [11] | 10.0 | 80 | 80 | 80 | 80 | 80 | (a) 6.2 |
|   | d-Sorbitol | 1.0 | 150 |   | 300 | 300 | 300 | (b) 10.4 |
|   | Sucrose | 1.0 | 300 | 300 | 300 | 300 | 300 | (c) 6.2 |
|   | Corn syrup | 20.0 | 150 | 300 |   |   |   | (d) 6.2 |
|   | Water | 100.0 |   |   | 30 | 30 |   | (e) 2.0 |
|   | Citric Acid |   |   |   |   | 3/16 |   |   |

| 12 | 40 fluidity corn starch | 11.0 | 1,300 | 13.0 |
|   | Water solution of red dye | 100.0 | 25 |   |
|   | Sucrose | 1.0 | 2,400 |   |
|   | Corn syrup solids | 3.5 | 2,400 |   |
|   | Water | 100.0 | 600 |   |
|   | Cocoanut flavor |   | 5 |   |

[1] Viscosity 8,500 cps. at 64% solids.
[2] Viscosity 8,100 cps. at 60% solids.
[3] Viscosity 1,350 cps. at 40% solids.
[4] Viscosity 200 cps. at 25% solids.
[5] Viscosity 2,280 cps. at 25% solids.
[6] Viscosity 2,280 cps. at 25% solids.
[7] Viscosity 2,280 cps. at 25% solids.
[8] Viscosity 5,250 cps. at 40% solids.
[9] Viscosity 2,280 cps. at 40% solids.
[10] Viscosity 2,280 cps. at 40% solids.
[11] Viscosity 200 cps. at 25% solids.

All of the starch products employed in the above examples had, of course, an amylose content no greater than about 35%.

In all of the examples described above, the product emerging from the extruder was a solid plastic mass, capable of retaining shape.

Variations in materials, proportions and procedures will be apparent to the practitioner, such variations coming within the scope of this invention, which is limited only by the following claims.

F. and finally to a temperature in the range of from about 100 to 250° F. while the pressure to which said mixture is subjected by the extruder is in the range of from about 50 to 5,000 p.s.i.; thereby effecting a dissolution of the starch and sugar with the simultaneous mixing and mastication of the mixture, and expelling the mixture from the extruder in the form of a solid, plastic, shape-retaining confectionery mass.

2. The method of making a confectionery product which comprises taking a mixture of sugar and a granular, ungelatinized, converted starch having an amylose content no greater than about 35% and having a fluidity of at least 20, the amount of starch being from about 10% to about 70% based on the weight of the total composition, said mixture containing from about 2% to about 13% of water based on the total weight of the composition, and said converted starch being in a non-dissolved form, and subjecting said mixture to the action of a heated extruder, and applying heat, pressure and shearing action on the mixture in and by the extruder, said mixture being initially subjected to heat in the barrel of said extruder, to a temperature in the range of from about 180 to 400° F. and finally to heat in the die of said extruder to a temperature in the range of from about 100 to 250° F. while the pressure to which said mixture is subjected in said extruder is in the range of from about 50 to 5,000 p.s.i.; the heat, pressure and shearing action of the extruder on the mixture thereby effecting a dissolution of the starch and sugar with the simultaneous mixing and mastication of the mixture, and expelling the mixture from the extruder in the form of a solid, plastic, shape-retaining confectionery mass.

References Cited by the Examiner
UNITED STATES PATENTS

| | | | |
|---|---|---|---|
| 1,725,171 | 8/1929 | Anderson | 99—82 |
| 2,197,919 | 4/1940 | Bowman. | |
| 2,256,190 | 9/1941 | Bowman | 107—54.6 |
| 2,726,960 | 12/1955 | Bolanowski | 99—134 |
| 2,847,311 | 8/1958 | Doumak et al. | 99—134 |
| 2,915,957 | 12/1959 | Bowman. | |
| 3,062,657 | 11/1962 | Vollink | 99—80 |
| 3,117,006 | 1/1964 | Wenger | 99—80 |

A. LOUIS MONACELL, *Primary Examiner.*

J. M. GOLIAN, *Assistant Examiner.*